(12) United States Patent
Larsen (10) Patent No.: US 8,499,333 B2
(45) Date of Patent: Jul. 30, 2013

(54) SECURE DEVICE FEATURE UNLOCK MECHANISM THIRD PARTY DEVELOPMENT

(75) Inventor: Tonni Sandager Larsen, Escondido, CA (US)

(73) Assignee: Sony Corporation, Tokyo (JP)

( * ) Notice: Subject to any disclaimer, the term of this patent is extended or adjusted under 35 U.S.C. 154(b) by 292 days.

(21) Appl. No.: 12/923,237

(22) Filed: Sep. 10, 2010

(65) Prior Publication Data

US 2012/0066746 A1    Mar. 15, 2012

(51) Int. Cl.
    *G06F 12/14*    (2006.01)
(52) U.S. Cl.
    USPC ............................ 726/2; 726/17; 726/27
(58) Field of Classification Search
    None
    See application file for complete search history.

(56) References Cited

U.S. PATENT DOCUMENTS

| | | | | |
|---|---|---|---|---|
| 6,748,380 B2 * | 6/2004 | Poole et al. | ................ | 717/174 |
| 7,127,307 B2 * | 10/2006 | Sasaki et al. | ................ | 700/96 |
| 7,707,409 B2 * | 4/2010 | Kwon et al. | ................ | 713/161 |
| 2006/0064761 A1 | 3/2006 | Multerer et al. | | |
| 2006/0259487 A1 * | 11/2006 | Havens et al. | ................ | 707/9 |
| 2010/0122351 A1 | 5/2010 | Lloyd et al. | | |

OTHER PUBLICATIONS

*iPhone Developer Program License Agreement* (20 pages), Jun. 9, 2008.
*Protecting the Blackberry device platform against malware—BlackBerry Enterprise Server Version 5.0 and later*, Research in Motion Ltd., pp. 1-17 (2001).

* cited by examiner

*Primary Examiner* — Kaveh Abrishamkar
(74) *Attorney, Agent, or Firm* — Haverstock & Owens LLP (57) ABSTRACT

An apparatus and method for managing device features though a network connection for receiving a request to download a development application from an application developer via a computing device, verifying the status of said application developer before the development application is sent to the computing device, verifying the status of said computing device on which the application is to be run before the development application is sent to the computing device, and for facilitating access to retrieve said development application in order to allow the application developer access to the unlocked features stored on the computing device.

15 Claims, 5 Drawing Sheets

SECURE DEVICE FEATURE UNLOCK MECHANISM THIRD PARTY DEVELOPMENT

BACKGROUND OF THE INVENTION

1. Field of the Invention

This invention relates generally to managing device features and more specifically keeping device features locked during normal use while having the capability of securely unlocking device features.

2. Description of the Related Art

As demand for a genuinely open source community where the next generation of networked application platforms may evolve, the marketplace is being overwhelmed with consumer electronics ranging from smart phones, hand held PDA's, and even digital book readers. Along with burgeoning consumer electronics market, application developers help to bridge the gap between the end consumer and their wants.

One conventional approach for protecting and controlling the use of software is done through licensing the use of software on a particular central processing unit residing on a computing device. After a code is generated at a central service, the code is provided to a third party publisher, who then provides the code to the end user, who then provides it to the computing device, thereby unlocking the appropriate software or features residing on the computing device. However, this approach is undesirable for an application developer who may need more extensive access to a computing device than a simple licensing code would provide. The networked application platform, on the other hand, may require additional protections when allowing the application access to normally locked features of the computing device.

Another mechanism for managing and providing services to a third party application developer involves allowing the application developer to use a scaled-down version of a registered application on a specific electronic device, creating a specialized version of the registered application. After which, a central facility can substitute the specific version of the registered application appropriate to the needs of the application developer and the specific electronic device. Once again, however, the third party application developer in need of unlocking key features and tools of a computing device, may require the full version of the registered development application vis-à-vis the electronic device.

Though other approaches have tried to protect the rights of application developer while protecting the digital content of the networked application platform, the current state of technology has not adequately accounted for targeting the requirements of specific users with specific devices. Requirements such as access to developer documentations, tools and SDK's.

It would be desirable to provide a secure, efficient and scaleable resource for third party application developers to ensure that only registered developers and registered devices gain access to developmental applications.

SUMMARY OF THE INVENTION

A mechanism is provided for keeping device features locked or reduced while the device is being used as a normal customer computer electronic device, but adds the capability of securely unlocking features for registered application developers and registered application development device only.

According to an embodiment of the invention, there is provided a mechanism for managing device features though a network connection for receiving a request to download a development application from an application developer via a computing device, wherein the development application being configured to unlock device features stored on the computing device, verifying the status of said application developer before the development application is sent to the computing device, verifying the status of said computing device on which the application is to be run before the development application is sent to the computing device, and facilitating access to retrieve said development application in order to allow the application developer access to the unlocked features stored on the computing device.

This mechanism can be embodied in various forms, including business processes, computer implemented methods, computer program products, computer systems and networks, user interfaces, application programming interfaces, and the like.

BRIEF DESCRIPTION OF THE DRAWINGS

These and other more detailed and specific features of the present invention are more fully disclosed in the following specification, reference being had to the accompanying drawings, in which.

DETAILED DESCRIPTION OF THE INVENTION

In the following description, for purposes of explanation, numerous details are set forth, such as flowcharts and system configurations, in order to provide an understanding of one or more embodiments of the present invention. However, it is and will be apparent to one skilled in the art that these specific details are not required in order to practice the present invention.

Opening normally locked down features on computer electronic devices can harm electronic devices and prompt unnecessary warranty claims. When a third party application developer signs up to become a registered application developer, the developer can gain access to developer documentation, tools and application development kits. Hence, by having the application developer register a device as an application development device, a development application ("Development App") may become available for download to the registered application development device.

Downloading and running this Development App may unlock features on the device which are otherwise locked for normal users. Since downloading and installing the Development App should void the warranty of the application development device, it becomes possible for the application developer to use the application development device for executing programs not normally tested or approved. This mechanism ensures only registered application developers and registered application development devices gain access to the unlocked features.

Figure 1:
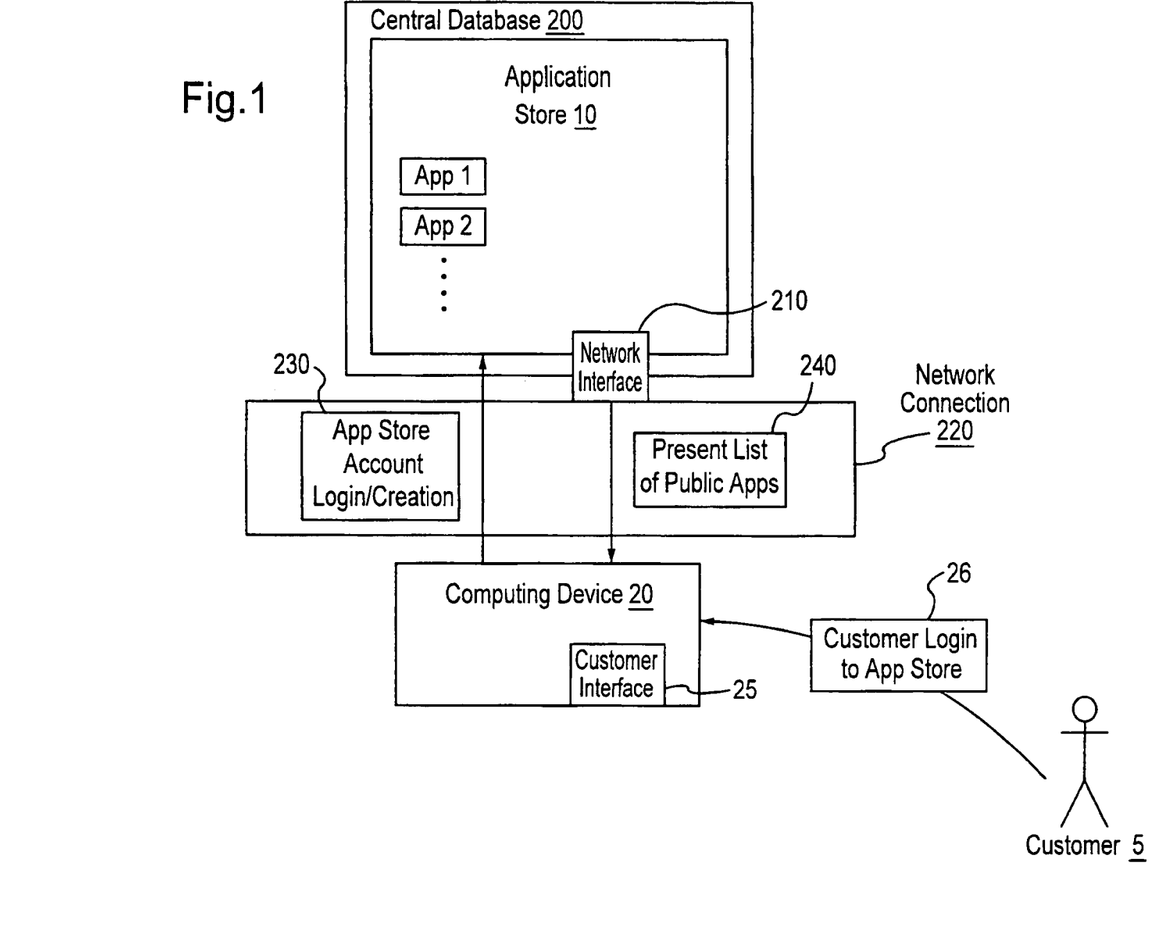
FIG. 1 is a schematic diagram illustrating a conventional approach for managing software applications via a network connection.

FIG. 1 is a conventional system for managing software applications via a network connection and illustrates the functional components for managing software applications. The system may be, for example, a mechanism for downloading software applications from an Application Store 10 to a computing device 20 by a customer 5 over a network connection 220.

The system may revolve around a central database 200 where the Application Store 10 is housed. Application Store 10 may facilitate access to software applications App1, App2, etc. Central database 200 is configured to have a network interface 210 that may communicate to computing device 20 over network connection 220.

Network interface 210 allows access to Application Store 10 over network connection 220 such that the computing device 20 may be configured to create an application login account 230. Application store 10 may be configured to output a list of public applications App1, App2, etc. over network connection 220 to computing device 20.

Computing device 20 is configured to have a customer interface 25 that may receive customer login information 26 from customer 5 such that Application Store 10 is accessible over network connection 220 where software applications App1, App2, etc. may be downloaded to computing device 20 over network connection 220.

To accommodate a download of software applications App1, App2, etc., computing device 20 is configured to receive customer login information 26 from customer 5 at customer interface 25. After this, the computing device 20 logs into App Store 10 over network connection 220 via network interface 210. After receiving App Store Account login information 230, network interface 210 outputs software applications App1, App2, etc., over network connection 220 such that the data base presents a list of public software applications 240 consisting of software applications App1, App2, etc. to the computer device 20 to be manipulated by customer 5.

Figure 2:
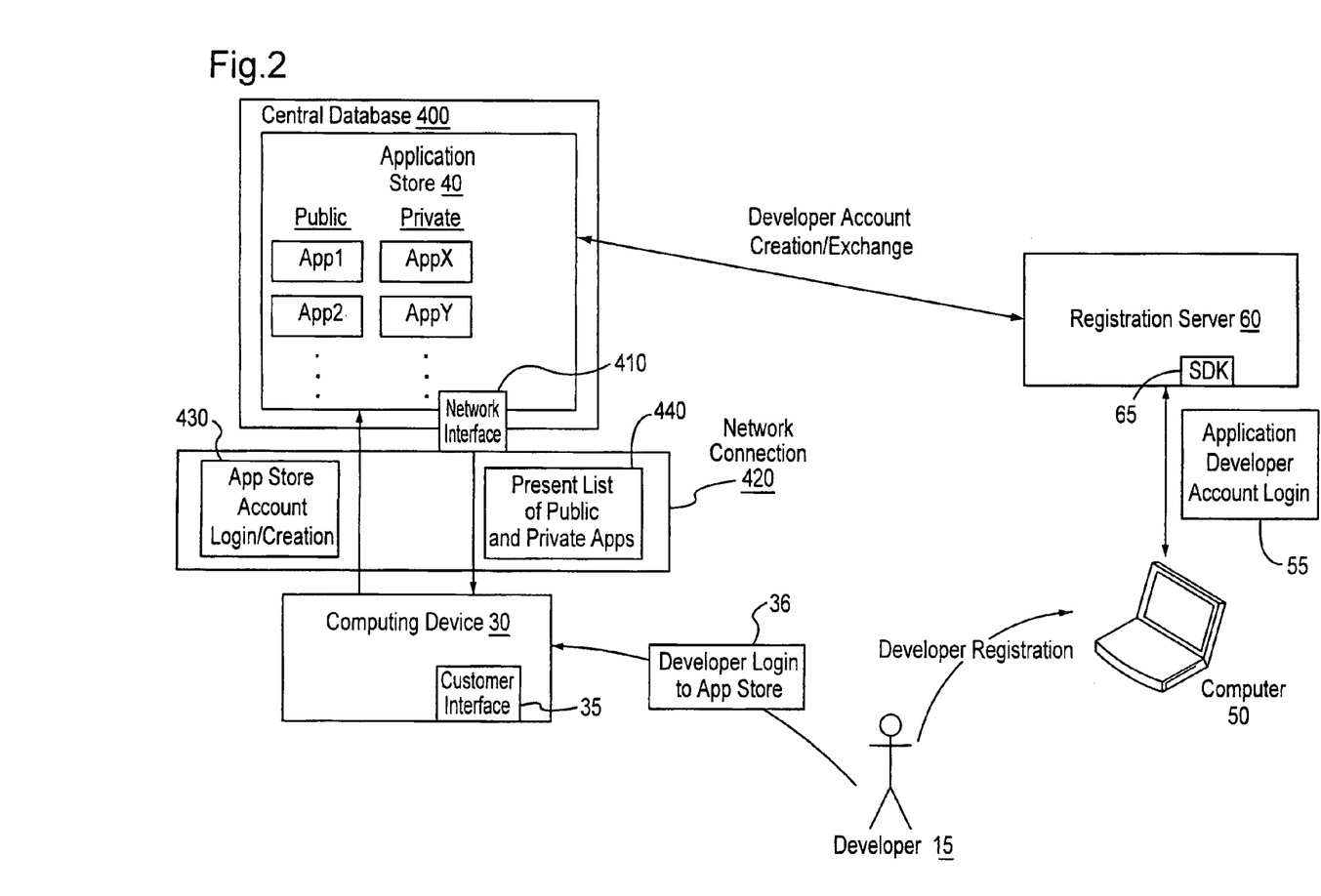
FIG. 2 is a schematic diagram illustrating an example of one aspect of managing software applications via a network connection for applications development.

FIG. 2 is a schematic diagram illustrating an example of one aspect of managing software applications via a network connection for applications development. The system facilitates downloading software applications from an Application Store 40 to a computing device 30 by a registered developer 15 over a network connection 420.

The system includes a central database 400 configured to house Application Store 40. Application Store 40 facilitates access to public software applications App1, App2, etc. and to private software applications AppX, AppY, etc. Central database 400 is configured to have a network interface 410 that communicates to computing device 30 over network connection 420.

Network interface 410 allows access to Application Store 40 over network connection 420 such that the computing device 30 is configured to create an application login account 430. Application store 40 is configured to output a list of public software applications App1, App2, etc. and private software applications AppX, AppY, etc. over network connection 420 to computing device 30. It may be appreciated that Central database 400 and network interface 410 that allows access to Application Store 40 over network connection 420 may reside in a server which can perform the functionality described below.

Computing device 30 is configured to have a developer interface 35 that receives developer login information 36 from developer 15 such that Application Store 40 is accessible over network connection 420 where public software applications App1, App2, etc. and private software applications AppX, AppY, etc. are downloaded to computing device 30 over network connection 420.

Developer 15 registers as an application developer through computer 50 via application developer account login 55 such that the developer 15 is listed on registration server 60 as a registered application developer. Upon recording the registration of developer 15, registration server 60 outputs SDK 65 to computer 50. The SDK 65 provides the PC environment in which the developer 15 can create applications.

In response to a request for verification of developer registration, the registration server 60 exchanges registered application developer account information with the Application Store 40. This ensures that only registered application developers are allowed access to private software applications AppX, AppY, etc.

To accommodate a secure download of private software applications AppX, AppY, etc., computing device 30 is configured to receive developer login information 36 from developer 15 at developer interface 35. Computing device 30 logs into App Store 40 over network connection 420 via network interface 410. After receiving App Store Account login information 430, central database 400 exchanges developer login information 36 with registration server 60. Registration server 60 verifies that developer login information 36 is associated with developer 15 such that developer 15 is a registered application developer, where the developer 15 has performed application developer account login 55.

After the verification process is complete, registration server 60 exchanges verification information with central database 400 indicating developer 15 is a registered application developer. At this point, network interface 410 securely outputs private software applications AppX, AppY, etc. as well as public software applications App1, App2, etc. over network connection 420 such that central database 400 presents a list of public and private software applications 440 to computer device 30 to be manipulated by developer 15.

Figure 3:
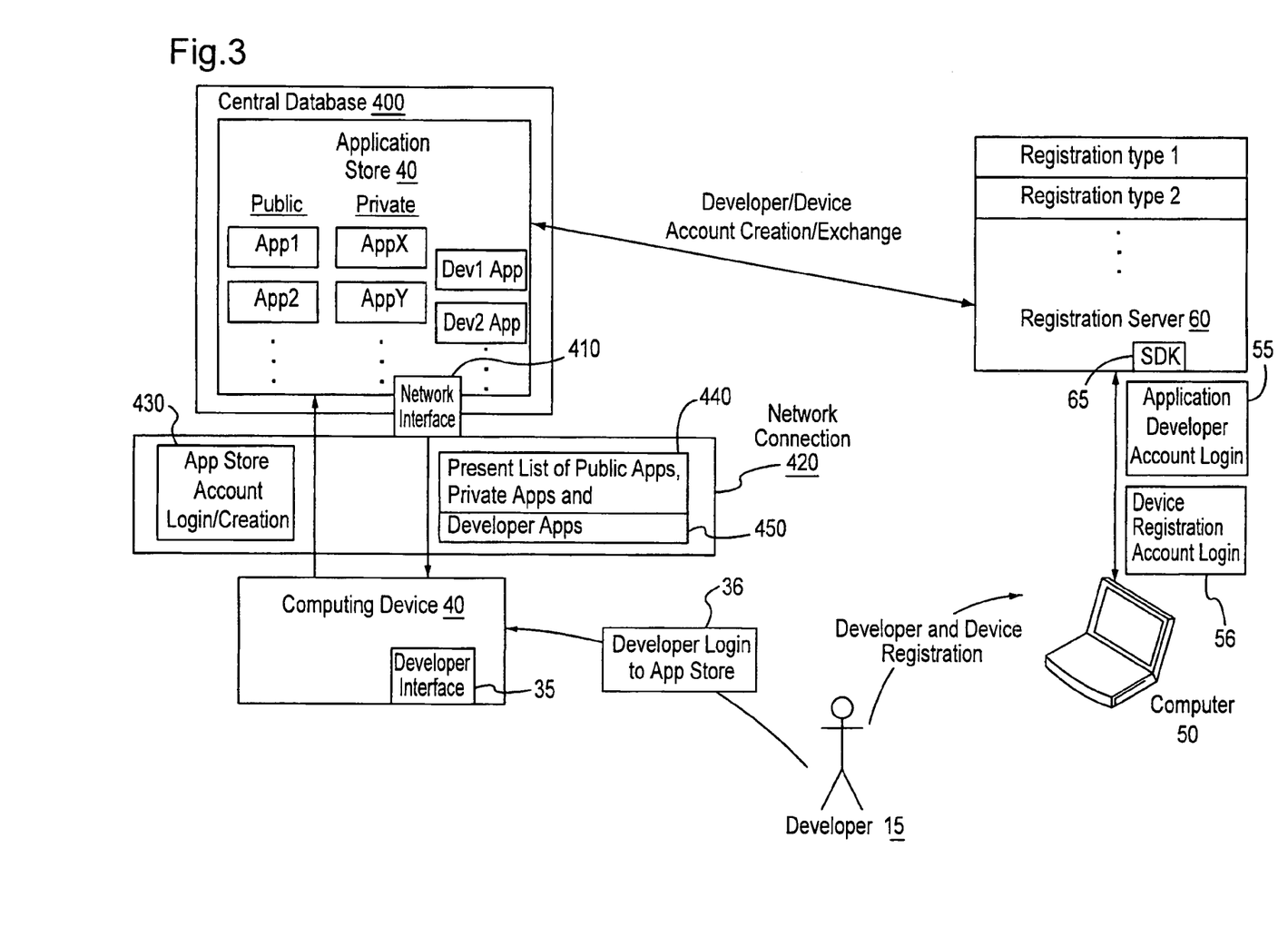
FIG. 3 is a schematic diagram illustrating an example of another aspect of managing software applications via a network connection for applications development.

FIG. 3 is a schematic diagram illustrating an example of another aspect of managing software applications via a network connection for applications development. The system facilitates downloading software applications from an Application Store 40 to a registered computing device 40 by a registered developer 15 over a network connection 420.

The system may include a central database 400 configured to house Application Store 40. Application Store 40 may facilitate secure access to public software applications App1, App2, etc., private software applications AppX, AppY, etc., an all purpose developmental application DEV1, and other levels of developmental applications DEV2, DEV3, etc. The development applications DEV2, DEV3, etc. change the behavior of the computing device such that various USB and debug ports are unlocked and accessible by registered developer 15. Central database 400 is configured to have a network interface 410 that communicates to computing device 30 over network connection 420.

Network interface 410 allows access to Application Store 40 over network connection 420 such that the computing device 30 is configured to create an application login account 430. Application store 40 is configured to output a list of public software applications App1, App2, etc., private software applications AppX, AppY, etc., an all purpose developmental application DEV1, and other levels of developmental applications DEV2, DEV3, etc. over network connection 420 to computing device 30. It may be appreciated that Central database 400 and network interface 410 that allows access to Application Store 40 over network connection 420 may reside in a server which can perform the functionality described below.

Computing device 30 is configured to have a developer interface 35 that receives developer login information 36 from developer 15 such that Application Store 40 is accessible over network connection 420 where public software applications App1, App2, etc., private software applications AppX, AppY, etc., an all purpose developmental application DEV1, and other levels of developmental applications DEV2, DEV3, etc., are downloaded to computing device 30 over network connection 420.

Developer 15 registers as an application developer through computer 50 via application developer account login 55. Upon recording the registration of developer 15, registration server 60 outputs SDK 65 to computer 50. The SDK 65 provides the PC environment in which the developer 15 can create applications.

In response to a request for verification of developer registration, the registration server 60 exchanges registered application developer account information with the Application Store 40. This similarly ensures that only registered application developers are allowed access to private software applications AppX, AppY, etc.

Developer 15 registers computing device 30 through computer 50 via device registration account login 56 such that computing device 30 is listed on registration server 60 as a registered developmental computing device. The registration server 60 records a list of registered developmental computing device with the matching registered application developer as an all purpose registration type REG type 1 or other registration types Reg type2, Reg type3, etc. such that warranty claims is handled properly. The registration server 60 also exchanges registered application developer account information with the Application Store 40 in response to a request for verification of developer registration.

It should be appreciated that this system is an assurance that only registered application developers associated with the appropriate registered developmental computing device are allowed access to an all purpose developmental application DEV1 or other levels of developmental applications DEV2, DEV3, etc. As an aside, all purpose registration type REG type 1 is associated with all purpose developmental application DEV1, while registration types Reg type2, Reg type3, etc. is associated with developmental applications DEV2, DEV3, etc.

To accommodate a secure download of developmental applications DEV1, DEV2, etc., computing device 30 is configured to receive developer login information 36 from developer 15 at developer interface 35. Computing device 30 logs into App Store 40 over network connection 420 via network interface 410. After receiving App Store Account login information 430, central database 400 exchanges developer login information 36 and information about computing device 30 with registration server 60. Registration server 60 verifies that developer login information 36 is associated with developer 15 such that developer 15 is a registered application developer. Registration server 60 also verifies that computing device 30 is associated with developer 15 such that developer 15 has performed computing device registration and performed application developer registration.

After the verification process is complete, registration server 60 exchanges verification information and registration type Reg type1, Reg type2, etc. information with central database 400 indicating developer 15 is a registered application developer and device 30 is a registered developmental computing device. At this point, network interface 410 securely outputs developmental applications DEV1, DEV2, etc., that correlate to registration types Reg type1, Reg type2, etc. over network connection 420 such that central database 400 presents a list of developmental software applications 450 to computer device 30, to be manipulated by developer 15. Private software applications AppX, AppY, etc. as well as public software applications App1, App2, etc. are also securely outputted over network connection 420 such that that data base presents a list of public and private software applications 440 to computer device 30, to be manipulated by developer 15.

Downloading and running an all purpose developmental application DEV1 or other levels of developmental applications DEV2, DEV3, etc., unlocks features on computing device 30 which are otherwise locked for normal users. By assuring that only registered application developers and registered developmental computing devices have access to the unlocked features an application developer uses the computing device 30 for executing programs not previously tested or approved for the computing device30. As an aside, an all purpose developmental application DEV1 or other levels of developmental applications DEV2, DEV3, etc., unlocks different types of content features on computing device 30 that are dependant upon the registered developmental computing device that is associated with the registered application developer.

Figure 4:
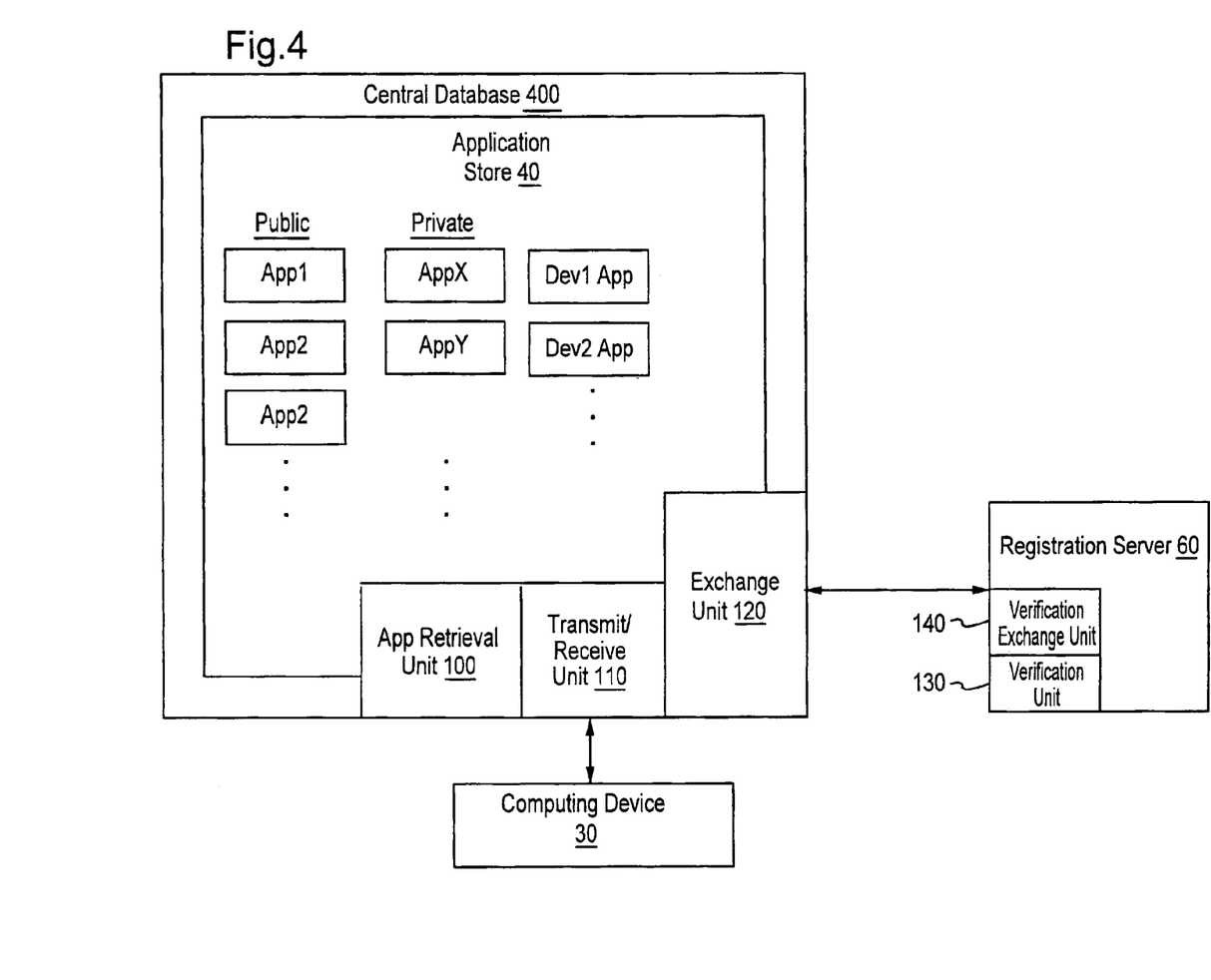
FIG. 4 is a block schematic illustrating an example of managing software applications via a network connection.

FIG. 4 is a block schematic illustrating an example of control system for managing software applications via a network connection. For illustrative purposes, the control system is considered to comprise a Central database 400, Application Store 40, public software applications App1, App2, etc., private software applications AppX, AppY, etc., developmental applications DEV1, DEV2, etc., application retrieval unit 100, transmit/receive unit 110, and exchange unit 120. A computing device 30 to be manipulated by a developer and a registration server 60 employing a verification unit 130 and verification exchange unit 140 is external to the control system.

Upon receiving a request for downloading public software applications App1, App2, etc., private software applications AppX, AppY, etc., and developmental applications DEV1, DEV2, etc., from computing device 30, Central database 400 exchanges computing device 30 information and developer 15 information with registration server 60 via exchange unit 120. Verification unit 130 is configured to verify that developer 15 is registered as an registered application developer and computing device 30 is registered as a registered developmental computing device. Verification exchange unit 140 exchanges registration information about developer 15 and computing device 30 with Central database 400.

Depending on the verification information received from verification exchange unit 140, application retrieval unit 100 is configured to retrieve either public software applications App1, App2, etc., private software applications AppX, AppY, etc., or developmental applications DEV1, DEV2, etc. from Application Store 40. Transmit/receive unit 110 is configured to transmit the appropriate software application to be downloaded onto computing device 30.

Figure 5:
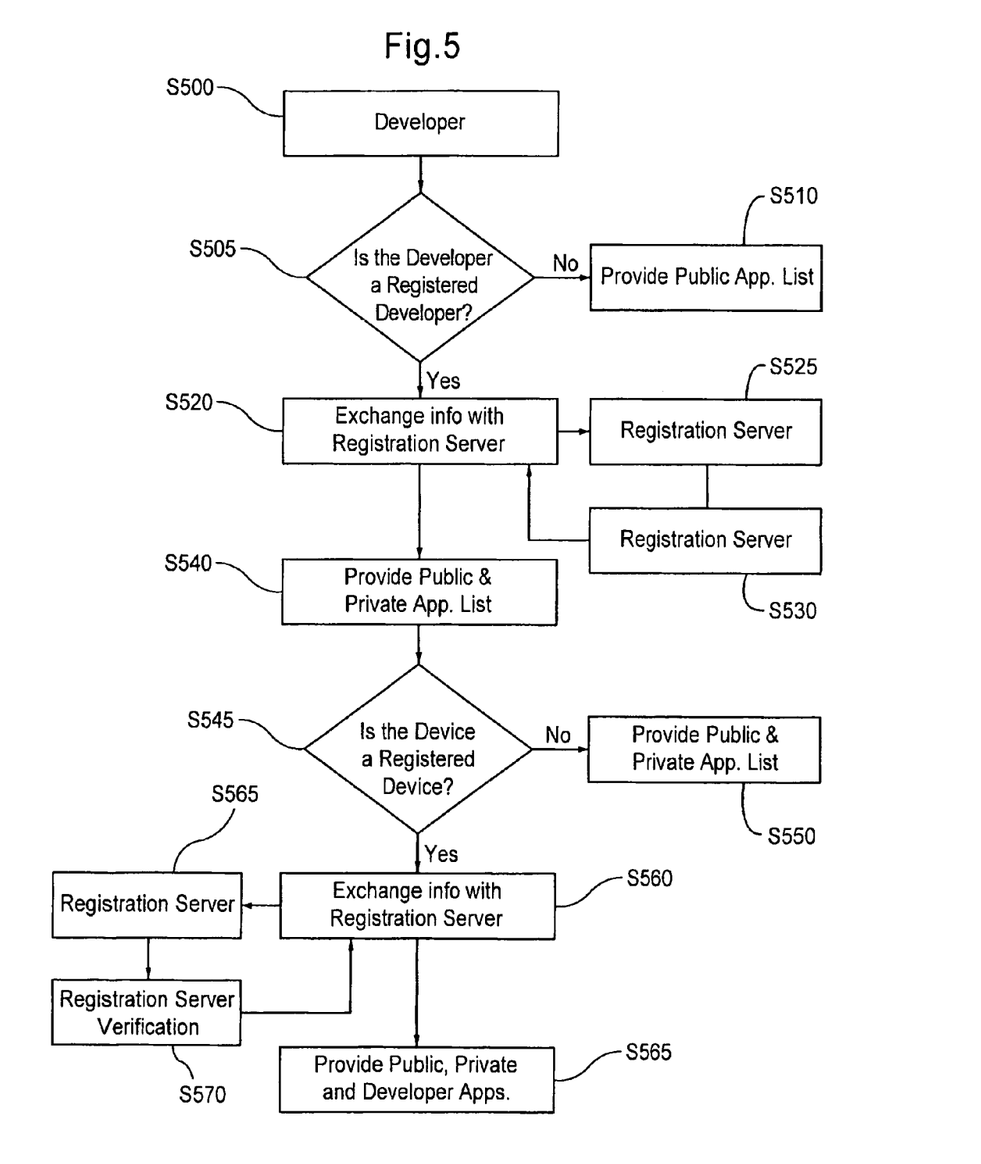
FIG. 5 is flow diagram showing one example of the registration process of managing software applications via a network connection.

FIG. 5 is flow diagram showing one example of the registration process of managing software applications via a network connection. At S500, the developer initiates a request for downloading certain software applications from an Application Store. At S505, the control system for managing software applications asks if the developer is a registered application developer. If the answer is no, the control system provides only the public software applications to the developer at S510.

If the answer to S505 is yes, developer information is exchanged at S520 and sent to registration server at S525. The registration server verifies at 530 the registration status of the developer given the information provided by exchange step 520 and outputs the registration status of developer back to exchange step 520. In the alternative, S520, S525, and S530 may occur before S505.

If the exchange step 520 receives status verification that the developer is a registered application developer, the control system provides both public software application and private software applications at S540.

After S540, the control system determines whether the computing device is a registered developmental device at S545. If so, the control system provides the public software applications and private software applications to the developer at S550.

If the computing device is a registered developmental computing device, computing device information is exchanged at S560 and sent to registration server at S565. The registration server verifies at 570 the registration status of the computing device given the information provided by exchange step 560 and outputs the registration status of computing device back to exchange step 560. In one alternative, S560, S565, and S570 may occur before S545.

If the exchange step 560 receives status verification that the computing device is a registered developmental computing device, the control system provides public software applications, private software applications, and DEV applications at S565.

The Central database 400 and the registration server 60 may be resident on any computing hardware and run on a conventional operating system to carry out the described functionality by execution of computer instructions. Operating systems may include but are not limited to Windows, Unix, Linux and Macintosh. The computer system may further implement applications that facilitate calculation including but not limited to MATLAB. The artisan will readily recognize the various alternative programming languages and execution platforms that are and will become available, and the present invention is not limited to any specific execution environment.

Although Central database 400 and the registration server 60 is preferably provided as software, it may alternatively be hardware, firmware, or any combination of software, hardware and firmware.

An article of manufacture wherein the program instructions that are executed to carry out the functionality described are stored on a computer readable storage medium. The medium may be of any type, including but not limited to magnetic storage media (e.g., floppy disks, hard disks), optical storage media (e.g., CD, DVD), and others.

Although the present invention has been described in considerable detail with reference to certain embodiments thereof, the invention may be variously embodied without departing from the spirit or scope of the invention. Therefore, the following claims should not be limited to the description of the embodiments contained herein in any way.

The invention claimed is:

1. A method for managing device features though a network connection, the method comprising:
   receiving a request to download a development application from an application developer via a computing device, wherein the development application is configured to unlock device features stored on the computing device;
   verifying the status of said application developer before the development application is sent to the computing device;
   verifying the status of said computing device on which the application is to be run before the development application is sent to the computing device; and
   facilitating access to retrieve said development application in order to allow the application developer access to the unlocked features stored on the computing device.

2. A method for managing device features of claim 1, further comprising:
   generating and sending a request for exchanging information about the status of the application developer.

3. A method for managing device features of claim 1, further comprising:
   generating and sending a request for exchanging information about the status of the computing device.

4. A method for managing device features of claim 1, wherein the development application is an all purpose development application.

5. A method for managing device features of claim 2, wherein
   the status of said application developer is verified if the application developer has previously registered as an application developer.

6. A method for managing device features of claim 3, wherein
   the status of said computing device is verified if the application developer has previously registered the computing device as a development device.

7. A method for managing device features of claim 1, wherein
   the development application changes the behavior of the computing device such that various USB and debug ports are unlocked and accessible by the application developer.

8. An apparatus for managing device features though a network connection, the apparatus comprising:
   a receiving means for receiving a request to download a development application from an application developer via a computing device, wherein the development application is configured to unlock device features stored on the computing device;
   a verifying means for verifying the status of said application developer before the development application is sent to the computing device;
   a verifying means for verifying the status of said computing device on which the application is to be run before the development application is sent to the computing device; and
   a retrieval means for facilitating access to retrieve said development application in order to allow the application developer access to the unlocked features stored on the computing device.

9. The apparatus for managing device features of claim 1, further comprising:
   a generating and sending means for generating and sending a request for exchanging information about the status of the application developer.

10. The apparatus for managing device features of claim 1, further comprising:
    a generating and sending means for generating and sending a request for exchanging information about the status of the computing device.

11. The apparatus for managing device features of claim 1, wherein the development application is an all purpose development application.

12. The apparatus for managing device features of claim 9, wherein the status of said application developer is verified if the application developer has previously registered as an application developer.

13. The apparatus for managing device features of claim 10, wherein the status of said computing device is verified if the application developer has previously registered the computing device as adevelopment device.

14. The apparatus for managing device features of claim 1, wherein the development application changes, the behavior of the computing device such that various USB and Debug ports are unlocked and accessible by the application developer.

15. A non-transitory computer readable medium including program code thereon, the program code being executable to perform operations comprising:

receiving a request to download a development application from an application developer via a computing device, wherein the development application is configured to unlock device features stored on the computing device;

verifying the status of said application developer before the development application is sent to the computing device;

verifying the status of said computing device on which the application is to be run before the development application is sent to the computing device; and facilitating access to retrieve said development application in order to allow the application developer access to the unlocked features stored on the computing device.

\* \* \* \* \*

UNITED STATES PATENT AND TRADEMARK OFFICE
CERTIFICATE OF CORRECTION

| | |
|---|---|
| PATENT NO. | : 8,499,333 B2 |
| APPLICATION NO. | : 12/923237 |
| DATED | : July 30, 2013 |
| INVENTOR(S) | : Tonni S. Larsen |

It is certified that error appears in the above-identified patent and that said Letters Patent is hereby corrected as shown below:

IN THE CLAIMS:

At column 9, line 10, please replace "adevelopment" with -- a development -- so that Claim 13 reads -- The apparatus for managing device features of claim 10, wherein the status of said computing device is verified if the application developer has previously registered the computing device as a development device --.

Signed and Sealed this
Twelfth Day of November, 2013

Teresa Stanek Rea
*Deputy Director of the United States Patent and Trademark Office*